US009542570B2

(12) United States Patent
Peng (10) Patent No.: US 9,542,570 B2
(45) Date of Patent: Jan. 10, 2017

(54) PERMISSION CONTROL (71) Applicant: Yang Peng, Shanghai (CN)

(72) Inventor: Yang Peng, Shanghai (CN)

(73) Assignee: SuccessFactors, Inc., San Francisco, CA (US)

( * ) Notice: Subject to any disclaimer, the term of this patent is extended or adjusted under 35 U.S.C. 154(b) by 109 days.

(21) Appl. No.: 14/536,935

(22) Filed: Nov. 10, 2014

(65) Prior Publication Data
US 2016/0132686 A1 May 12, 2016

(51) Int. Cl.
G06F 17/30 (2006.01)
G06F 21/62 (2013.01)

(52) U.S. Cl.
CPC .................. G06F 21/6218 (2013.01)

(58) Field of Classification Search
USPC ........................................................ 726/28
See application file for complete search history.

(56) References Cited

U.S. PATENT DOCUMENTS

| 7,333,987 | B2 * | 2/2008 | Ross | G06F 21/6227 |
| | | | | 707/693 |
| 7,503,075 | B2 * | 3/2009 | Sturms | G06F 21/6218 |
| | | | | 707/999.009 |
| 7,599,937 | B2 * | 10/2009 | Dutta | G06F 21/6227 |
| 7,681,236 | B2 * | 3/2010 | Tamura | H04L 63/1441 |
| | | | | 726/23 |
| 7,716,291 | B2 * | 5/2010 | Thorson | G06Q 20/085 |
| | | | | 705/50 |
| 7,761,704 | B2 * | 7/2010 | Ho | H04N 5/913 |
| | | | | 380/201 |
| 8,166,553 | B2 * | 4/2012 | Kubota | G06F 21/552 |
| | | | | 705/38 |
| 8,205,239 | B1 * | 6/2012 | Satish | H04L 63/102 |
| | | | | 726/1 |
| 8,307,427 | B1 * | 11/2012 | Wisilosky | G06F 21/16 |
| | | | | 707/781 |
| 8,438,612 | B2 * | 5/2013 | Faitelson | G06F 21/604 |
| | | | | 726/2 |
| 8,635,660 | B2 * | 1/2014 | Ng | 707/694 |
| 8,645,340 | B2 * | 2/2014 | Kester | G06F 11/3476 |
| | | | | 707/694 |
| 8,887,308 | B2 * | 11/2014 | Grecia | H04L 63/10 |
| | | | | 713/185 |
| 2002/0129235 | A1 * | 9/2002 | Okamoto | G06Q 30/02 |
| | | | | 713/150 |
| 2003/0101341 | A1 * | 5/2003 | Kettler, III | G06F 21/6245 |
| | | | | 713/162 |

(Continued)

Primary Examiner — Amare F Tabor
(74) Attorney, Agent, or Firm — Mintz Levin Cohn Ferris Glovsky and Popeo, P.C.

(57) ABSTRACT

In some example implementations, there is provided a method including determining, from a received request, one or more attributes; sending, by a permission controller, a query to a use case database, the query including the determined attributes to enable an identification by the use case database of a matching use case stored in the use case database; approving, by the permission controller, the requested access to the data, when a response to the query indicates the matching use case was found in the use case database; rejecting, by the permission controller, the requested access to the data, when the response to the query indicates the matching use case was not found in the use case database.

20 Claims, 3 Drawing Sheets (56) References Cited

U.S. PATENT DOCUMENTS

| | | | |
|---|---|---|---|
| 2003/0229706 A1* | 12/2003 | Park | G06Q 30/0601 709/229 |
| 2007/0130616 A1* | 6/2007 | Ng | G06F 21/6227 726/4 |
| 2008/0091681 A1* | 4/2008 | Dwivedi | G06F 21/554 |
| 2009/0288169 A1* | 11/2009 | Petta | G06F 17/30864 726/26 |
| 2012/0005729 A1* | 1/2012 | Amitai | H04L 63/102 726/4 |
| 2013/0133066 A1* | 5/2013 | Natarajan | H04L 63/1408 726/23 |
| 2013/0185765 A1* | 7/2013 | Hew | H04L 63/10 726/3 |

* cited by examiner

PERMISSION CONTROL

FIELD

The present disclosure generally relates to permission control.

BACKGROUND

Information technology systems have become increasingly complex. Along with that increase in complexity has come also the need to protect information contained in these systems. However, the complexity of some information technology systems makes protecting access to information especially challenging and, as a consequence, complex which increases processing burden on the machines (as well as the user accessing those systems). Although some systems, such as those processing sensitive healthcare or financial information, may require high-integrity permission control, other systems simply do not, but do require some way of controlling data access.

SUMMARY

Methods and apparatus, including computer program products, are provided for permission control and security.

In some example implementations, a method may be provided that includes receiving a request to access data; determining, from the request, one or more attributes representative of an identity of an entity making the request and a type of the data; sending, by a permission controller, a query to a use case database, the query including the determined attributes to enable an identification by the use case database of a matching use case stored in the use case database; approving, by the permission controller, the requested access to the data, when a response to the query indicates the matching use case was found in the use case database; rejecting, by the permission controller, the requested access to the data, when the response to the query indicates the matching use case was not found in the use case database; and sending, by the permission controller, a conflict request to add another use case to the use case database, when the response to the query indicates the matching use case was not found in the use case database.

In some implementations, the above-noted aspects may further include additional features described herein including one or more of the following. The request to access data may represent an access to at least one of an application, a service, a feature, or a data item. The determining may include determining an owner of the data. The formed query may include the attributes. The attributes may include the identity of the entity making the request, the type of the data, and the owner of the data. The response to the query may be received from the use case database. The conflict request may be sent to an arbitrator. The conflict request may include the attributes, the attributes including the identity of the entity making the request, the type of the data, and the owner of the data. An indication of whether the conflict request resulted in an approval to access the data may be received from the arbitrator. The permission controller may send, when the indication represents the approval, another query to the use case database. The other query may include the identity of the entity making the request, the type of the data, and the owner of the data. The permission controller may send an access denied message, when the indication represents the approval. The matching use case may match the attributes.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Like labels are used to refer to same or similar items in the drawings.

DETAILED DESCRIPTION

In some example implementations, there is provided a permission controller that adapts to whether it grants access to data, such as an application, a service, a feature, a data object, and/or the like, based on precedent from past use cases. For example, the permission controller may query a use case database that includes past uses cases related to users and the approved actions the users have taken in the past. In this sense, the permission controller is adaptive and somewhat self-maintaining in the way it controls access to data based on past approved use cases.

Figure 1:
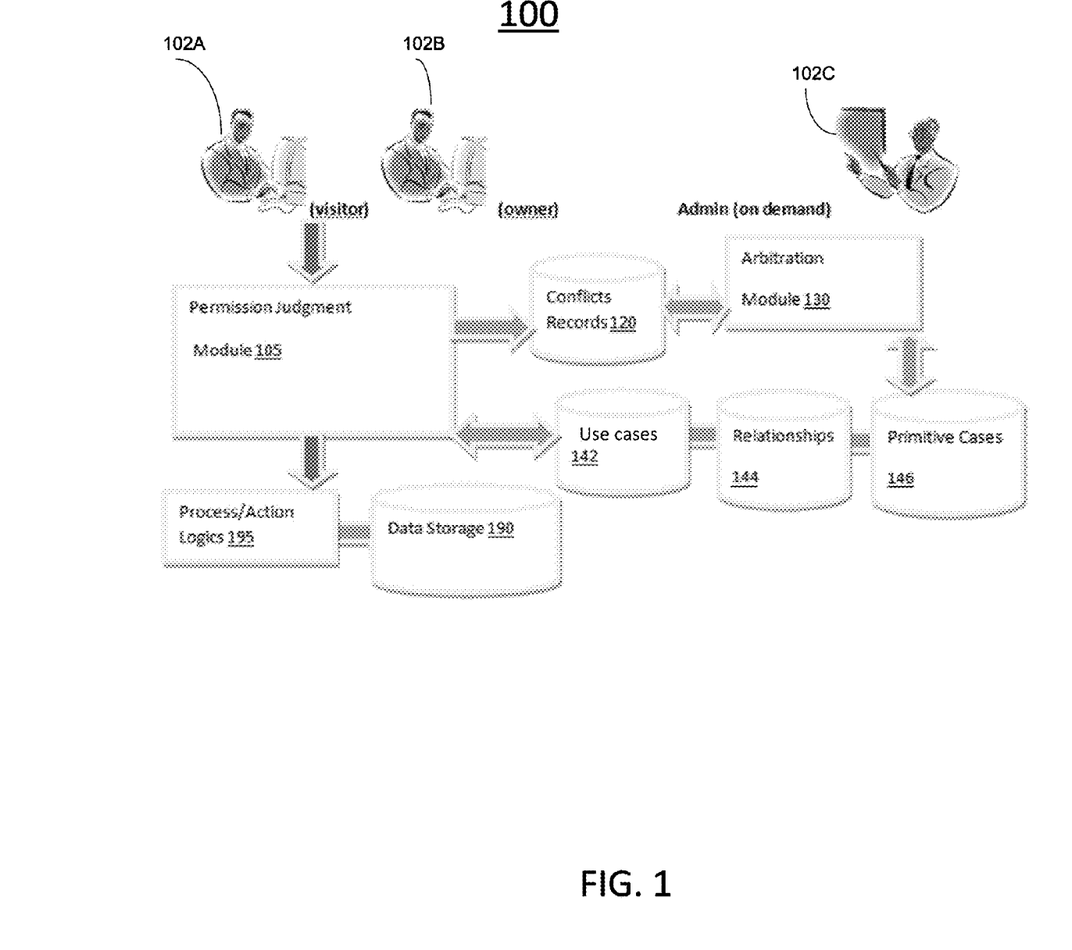
FIG. 1 depicts an example of a system for permission control, in accordance with some example implementations.

FIG. 1 depicts an example permission control system 100, in accordance with some example implementations. The permission control system 100 may be incorporated into, or coupled to, another system, such as an enterprise resource planning (ERP) system and/or any other type of system. For example, permission control system 100 may control whether users are allowed to access (for example, view, use, change, and/or perform any other action/operation) data at the ERP system, as well as other types of systems including cloud-based systems. Moreover, the permission control system 100 may grant the access to a user based on precedential use cases for the user or class of users.

Permission control system 100 may include a permission judgment module 105 configured to determine whether a given user is granted permission to access certain data. For example, when a user 102A (labeled "visitor") attempts to perform an action, such access data for example, permission judgment module 105 may determine if there is a similar use case for that user that has been approved in the past at system 100 (or has been recorded as a default use case). To that end, permission judgment module 105 may query use case database 142, where previous use cases and/or default use cases are stored as for example a database, in order to identify one or more approved use cases that correspond to the given user performing the requested data access. For example, permission judgment module 105 may query use case database 142 based attributes, such as the identity of the user, the type of data being accessed, and the owner of the data.

If the query of use case database 142 identifies a matching use case (for example, one or more approved use cases that correspond to the attributes of the identity of the user, the type of data being accessed, and the owner of the data user performing the requested data access), use case database 142 may respond to permission judgment module 105 with an indication that a matching use case has been identified. Permission judgment module 105 may, in response to the received indication, grant/allow the given user 102A access to perform the requested action.

However, if use case database 142 cannot identify a matching use case, use case database 142 may respond with an indication that a match has not been identified. When this is the case, permission judgment module 105 may reject or not allow the action to be performed by user 102A.

In some implementations, permission judgment module 105 may handle the rejected action as a conflict, and submit a conflict request for the rejected action to conflict records 120 and/or arbitration module 130. When this is the case, a user 102C (labeled admin) may approve or reject the conflict request representative of the rejected action to be performed by user 102A.

Figure 2:
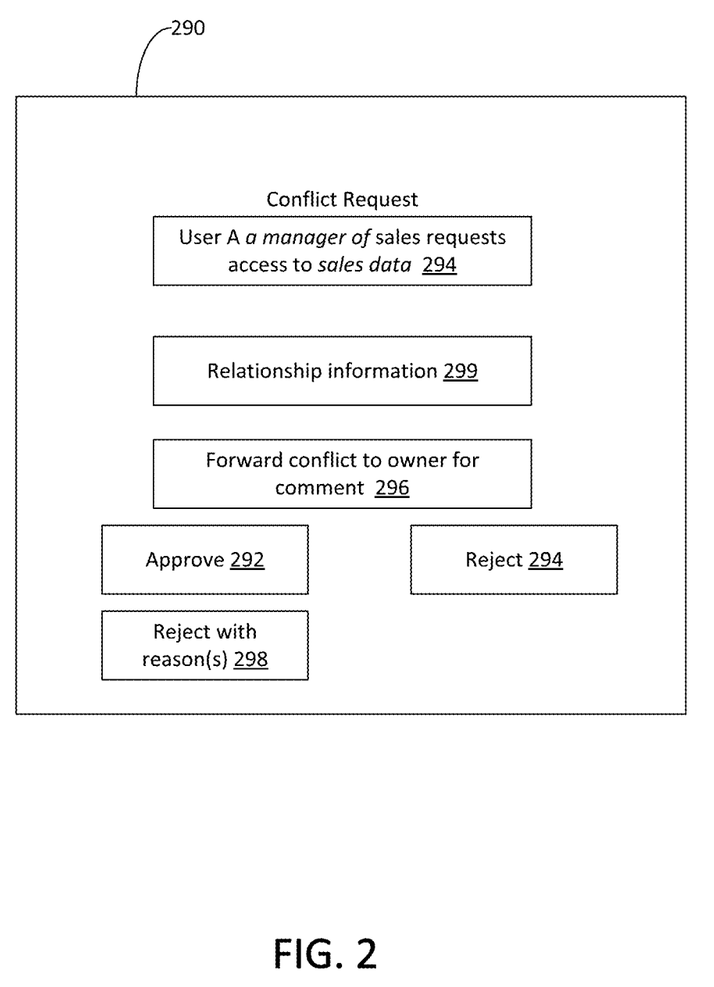
FIG. 2 depicts a user interface for approving data access, in accordance with some example implementations.

FIG. 2 depicts a user interface 290 that may be presented to user 102C. The user interface 290 may include the conflict request 294, which further includes the identity of user 102A, an action user 102A is trying to seek approval on, and/or other information regarding the user, action, and/or the like. The user interface may also include relationship information 299 representative of the relationship between the requester, such as user A and the owner of the requested data. And, this relationship information may be obtained from relationship database 144. The user interface may also include a forwarding icon 296 to enable forwarding of the conflict request to an owner of the data being accessed, an approval icon 292 to approve the conflict request, a rejection icon 294 to reject the conflict request, and a reject with reasons icon 298 where a reason for the rejection can be provided as well.

Although the previous example describes a user interface based mechanism for approval, the approval may be performed in other was as well. For example, the user 102C may be implemented as a machine that evaluates the identity of user 102A, action user 102A is trying to seek approval on, and/or other information to determine whether to approve or reject the conflict request without the use of user interface 290.

If the conflict request is not approved by arbitration module 130, arbitration module 130 may provide an indication of the denial to permission judgment module 105. If the conflict request is approved, arbitration module 130 provides the approved conflict to use case database 142. Moreover, arbitration module 130 sends an indication to permission judgment module 105 to enable permission judgment module 105 to again judge whether user 102A should be granted the data access. However, now that use case database 142 includes a use case for user 102A and the requested action, permission judgment module 105 can approve the data access request.

In some implementations, permission judgment model 105 may be implemented in the non-sensitive systems where certain users can determine their own behavior. For example, in a permission critical system where permission control and data security is precisely controlled, permission judgment model 105 may not be utilized but instead permission judgment model 105 may be used in for example less permission control sensitive frameworks (for example, a wiki, an internal company forum, a data/task tracking system, and/or the like).

Referring again to FIG. 1, user 102A may be a manager, and, as such, may want to view salary information for those employees working for her or him. But permission judgment model 105 may, after accessing use case database 142, reject the manager's 102A access to the information as use case database 142 does not include a use case for the manager's access salary information for the manager's direct reports. When this is the case, permission judgment model 105 submits a conflict request to conflict records 120 and arbitration module 130. In this example, the conflict request may be "Engineer manager in depart A should have permission to see Jason's salary." However, arbitration module 130 (alone and/or in combination with input from admin user 102C) might reject the conflict because in this example the conflict request lacks sufficient information (for example, the conflict request in this example lacks the relationship between the manager and Jason). This rejection is sent to the permission judgment model 105. Moreover, the rejection may include a reason for the rejection, such as insufficient relationship information showing the relationship between the manager and Jason).

In response to the rejection, permission judgment model 105 may generate another conflict request and submit the conflict to conflict records 120 and arbitration module 130. Returning to the previous example, the second conflict request may be "Engineer manager in depart A should have permission to see direct report's salary; date range is performance review phase (yearly starting in November for 4 months)." In this example, arbitration module 130 may query relationship database 144 to obtain relationship information for department A, such as the identity of engineering manager and the identities of the employees working for that manager. Arbitration module 130 (alone and/or in combination with input from admin 102C) may then approve the access indicated by the conflict request. When this is the case, arbitration module 130 may send an indication to permission judgment module 105 that the conflict request has been approved. Arbitration module 130 may save the use case to use case database 142. In response, permission judgment module 105 may check use case database 142 to determine whether to grant the manager's 102 access, which will be approved since use case database 142 now includes a use case stating "Engineer manager in depart A should have permission to see direct report's salary; date range is performance review phase."

Referring again to the manager use case example above, the use case may be specific to the identity of the manager. However, the use case may be defined and stored at use case database 142 in a more generic, role-based manner, so that all of the managers department A can view their direct reports salary information during the 4 month time period. An example of this use case may take the following form:

Visitor Attributes:
Manager of: yes
Department: A
Resource Type:
HR Record.Salary
Ownership Attributes:
Department: A
Environment Attributes:
Date Range: November+4 Month.

Although the previous example shows certain attributes, other attributes may be used as well.

As shown in FIG. 1, system 100 may categorize users. For example, user 102A may be classified by system 100 as a visitor 102A. The system 100 may handle a visitor as a user that raises a request to access some feature/data in a target system (for example, an ERP system or cloud-based resource which has its access controlled by system 100). System 100 may treat some users 102B as owners. System 100 may handle the owner as a set of attributes describing who owns (or controls) data. In some instances, owner 102B may be defined as the entity allowed to ultimately determine whether to grant permission to user 102A (a standalone rule). The system 100 may also handle some users as administrators (admin) 102C of system 100. The admin may be an entity that is authorized via arbitrator 130 to approve a user's access (for example, add a use case to use case database 142) or reject a conflict request triggered by a visitor's 102A attempted data access. Moreover, the arbitrator 130 may, in some implementations, be the only component system 100 allowed to add use cases to use case database 120.

The use case database 142 may, as noted, store one or more use cases corresponding to allowed actions for a certain user or type/class of users. The use cases may in essence represent rules. The use cases may be saved in database 142 so that subsequent requests can be approved by permission judgment module 105 after accessing use case database 142 to identify a previously approved use case. Moreover, use case database 142 may take into account the attributes of visitor 102A. The attributes can be dynamic in the sense that they take into account a class or type of user, and, as such, can define a plurality of users. For example, a dynamic attribute in a use case or conflict request may be "a manager of" department A. In this example, whoever is the manager of department A (which can be determined via relationship database 144) can be granted data access. In contrast, a more static attribute may explicitly list the identity of the user, a position, a title, a department, and/or the like. The use cases in use case database 142 may also take into account the type of data being accessed. For example, the type of resource being accessed may define or identify a human resources record, a sales database, an employment record, a blog, and/or the like. Furthermore, the use cases in use case database 142 may also identify an owner of the data being accessed. For example, an owner of an employment record may be identified by username or email address of the owner. The use cases in use case database 142 may also take into account environment attributes which describe when or under what circumstance the data access can be granted. For example, the environment attributes may comprise a date range or other condition. These and other attributes may be included in a use case to define a use case in use case database 142.

Permission judgment module 105 and/or arbitrator 130 may, as noted, seek relationship information. This relationship may include the relationship of the user requesting access to the data and the owner or subject of the data. For example, relationship information may include organizational data that defines user 102A as a manager of the individual or as a subject of the data. The relationship information may be defined in a variety of ways. For example, the relationships may have predetermined forms, such as manager of, report of, friend of, team member of, spouse of, partner of, child of, and/or the like. The relationship information may also include corporate contact information. The relationship information may be used by permission judgment module 105 to calculate the attributes of the user visitor 102A making the data request and/or the owner (or subject of) the data. The attributes can then be used to query use case database to determine whether an approved use case allows the data access.

In some implementations, primitive cases 146 determine a basic permission granting scheme at system 100. For example, a primitive rule may be fixed when system 100 is bootstrapped, so that it cannot (or should not) be modified during system operation. Examples of primitive rules include fundamental permissions, such as who can visit certain data and/or the like. The permission judgment model 105 may query primitive cases 146 to determine whether there is a primitive rule related to the visitor's access and, if so, grant or deny that access based on the primitive rule. To further illustrate, primitive rules may be common rules setup in the system initially. For example, a primitive rule might be everyone can access their own data (including salary, job grade, HR information), everyone can access company public information (for example, the data owner is company and the company attribute "isPublic" set to true), or manager can see HR data for his/her direct reports.

Figure 3:
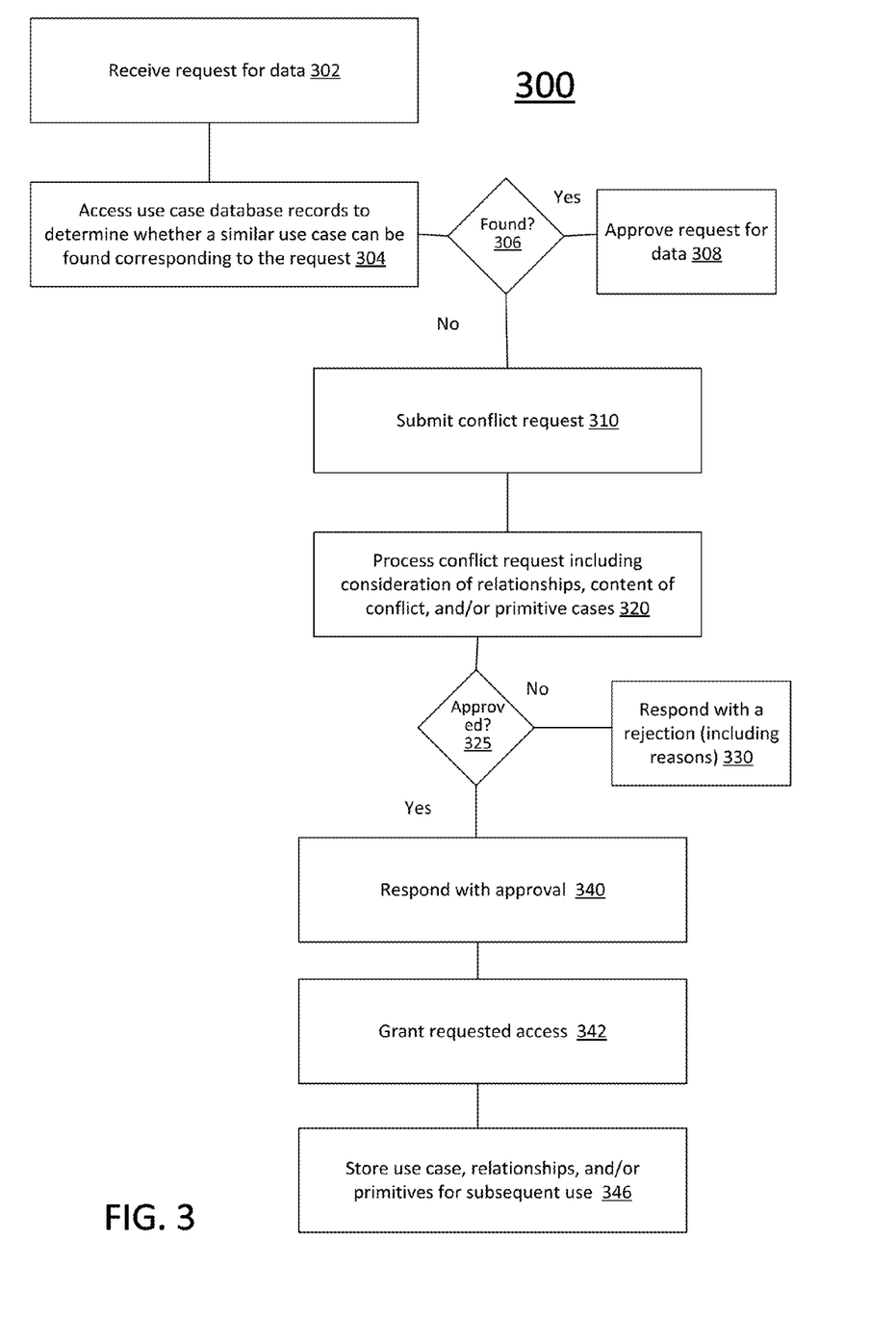
FIG. 3 depicts an example of a process for controlling data access, in accordance with some example implementations.

FIG. 3 depicts an example process 300 for permission control. The description of process 300 also refers to FIG. 1.

At 302, permission judgment model 105 may receive a request for a data access, when visitor 102A attempts to access data. In response to the request for data access, permission judgment model 105 may, at 304, query use case database 142 to determine whether a similar use case corresponding to the data access request is stored at use case database 142. For example, if visitor 102A in the sales department seeks access to sales data, permission judgment model 105 may, at 304, query use case database 142 for a use case corresponding to "Jane member of sales department request access to sales data."

To grant permission, when user 102A attempts to access data (for example, read or view data, perform a certain feature or action, access a service, data object, or application, and/or the like), permission judgment model 105 may calculate the visitor's 102A attributes. These attributes may include the identity of the visitor, the visitor's role in an organization (for example, manager), a visitor's relationship to the data being accessed or owner of the data, and the like. Permission judgment model 105 also determines the type of resource being accessed and the ownership attributes of the resource being accessed, and/or environment attributes. Permission judgment model 105 may then use the determined attributes to query, at 304, use case database 142 for a similar or a matching allowed use case.

To illustrate further, when a access request occurs (for example, user A wants to access user B's medical records), permission judgment model 105 may gather user A's attributes, attributes for the company, attributes user B, and attributes medical record (as well as other environmental attributes). The attributes are then used to build a context, which forms a query to determine a matched case. To detect a matching use case, the primitive rules 146 may be queried as well as use cases 142 to determine whether there any use cases relate to accessing medical information, whether there any uses cases relate to a person like user A, whether there are any uses cases that relate to a request targeting users like user B, and so forth. This process may (or may not) determine a matching use case (or primitive rule), which triggers a conflict request as noted above.

For certain types of resources, permission judgment model 105 accesses primitive cases database 146 in addition to, or instead of, use case database 142. When a user wants to access his or her own medical record for example, a primitive rule search, based on the context of the attributes of medical records, the requestor being the owner, and/or the like, may detect a primitive rule that states the following:

primitive rule status is active
    request user=owner
    target=medical record of owner In this example, the primitive rule would allow a requesting owner to access his or her own medical records so a query of uses cases 142 is not be required. If there is no match found in the primitive cases database 146, permission judgment model 105 may then query use case database 142.

If use case database 142 includes a similar use case corresponding to the request, use case database 142 may respond to permission judgment model 105 with for example an approval and/or a copy of the similar use case (for example, stored at use case database 142 as "members of sales department allowed access to sales data" or "Jane member of sales allowed access to sales data," so that permission judgment model 105 can approve the access (yes at 306 and 308).

If use case database 142 does not include a similar conflict record corresponding to the request, use case database 142 may respond to permission judgment model 105 with for example an indication that a similar use case was not found, in which case permission judgment model 105 may submit a conflict request to conflicts records 120 and arbitration module 130 (no at 306 and 310).

Arbitration module 130 may process the conflict request to determine whether to approve the conflict request. This processing may include accessing relationships 144 and/or primitive cases to obtain information related to the requested access. Returning to the previous example, the conflict request for "member of sales department access to sales data" may include accessing relationship information 144 for the sales department to determine the identity of the members of that department. Moreover, arbitration module 130 may send an indication to a user, such as admin 102C, to approve the conflict request for "member of sales department access to sales data" (which if approved would become a use case).

If not approved by arbitration module 130, the arbitration module may send a response to permission judgment module 105 to indicate the rejection (no at 325 and 330).

If approved by arbitration module 130, the arbitration module may respond to permission judgment module 105 with an indication of the approval (yes at 325 and 340). In response to the indication, permission judgment module 105 may grant, at 342, visitor 102A the data access requested at 302. Moreover, permission judgment module 105 may store, at 346, the use case, relationship information, and/or primitive rule to enable subsequent use when approving data access.

In some implementations, admin user 102C may attempt to access arbitration module 130, and obtain permission to access arbitration module 130. In some implementations, admin 102C may access use case database 142 in order to modify one or more of the use cases and/or primitives. With use cases, admin 102C may modify the attributes for a use case and save it in use case database 142. In the case of a primitive, admin 102C may modify the attribute for the primitive and save it in primitive cases database 146. The primitive may take affect after a restart or boot (which allows for a roll back of the change); while the use case may take effect on save.

Without in any way limiting the scope, interpretation, or application of the claims appearing below, a technical effect of one or more of the example implementations disclosed herein is adaptive data security.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A computer-readable medium containing instructions to configure at least one processor to cause operations comprising:
receiving a request to access data;
determining, from the request, one or more attributes representative of an identity of an entity making the request and a type of the data;
sending, by a permission controller, a query to a use case database, the query including the determined one or more attributes to enable an identification by the use case database of a matching use case stored in the use case database;
approving, by the permission controller, the requested access to the data, when a response to the query indicates the matching use case was found in the use case database;
rejecting, by the permission controller, the requested access to the data, when the response to the query indicates the matching use case was not found in the use case database;
sending, by the permission controller, a conflict request to an arbitrator, the conflict request representing a request to add another use case to the use case database, the conflict request including the one or more attributes, the one or more attributes including the identity of the entity making the request, the type of the data, and an owner of the data, when the response to the query indicates the matching use case was not found in the use case database;
receiving, from the arbitrator, an indication of whether the conflict request resulted in an approval to access the data; and
sending, by the permission controller when the indication represents the approval, another query to the use case database, the other query including the identity of the entity making the request, the type of the data, and the owner of the data, wherein the use case database includes, as a result of an update provided by the arbitrator, a corresponding matching use case for the other query.

2. The computer-readable medium of claim 1, wherein the request to access data represents an access to at least one of an application, a service, a feature, or a data item.

3. The computer-readable medium of claim 1, wherein the determining further comprises:
determining the owner of the data.

4. The computer-readable medium of claim 3 further comprising:
forming the query to include the one or more attributes, the one or more attributes including the identity of the entity making the request, the type of the data, and the owner of the data.

5. The computer-readable medium of claim 1 further comprising:
receiving, from the use case database, the response to the query.

6. The computer-readable medium of claim 1 further comprising:
receiving, by the permission controller, an access denied message, when the indication does not represent the approval.

7. The computer-readable medium of claim 1, wherein the matching use case matches the one or more attributes.

8. A system comprising:
at least one processor; and
at least one memory including program code which when executed by the at least one processor causes operations comprising:
receiving a request to access data;
determining, from the request, one or more attributes representative of an identity of an entity making the request and a type of the data;
sending, by a permission controller, a query to a use case database, the query including the determined attributes to enable an identification by the use case database of a matching use case stored in the use case database;
approving, by the permission controller, the requested access to the data, when a response to the query indicates the matching use case was found in the use case database;
rejecting, by the permission controller, the requested access to the data, when the response to the query indicates the matching use case was not found in the use case database;
sending, by the permission controller, a conflict request to an arbitrator, the conflict request representing a request to add another use case to the use case database, the conflict request including the one or more attributes, the one or more attributes including the identity of the entity making the request, the type of the data, and an owner of the data, when the response to the query indicates the matching use case was not found in the use case database;
receiving, from the arbitrator, an indication of whether the conflict request resulted in an approval to access the data; and
sending, by the permission controller when the indication represents the approval, another query to the use case database, the other query including the identity of the entity making the request, the type of the data, and the owner of the data, wherein the use case database includes, as a result of an update provided by the arbitrator, a corresponding matching use case for the other query.

9. The system of claim 8, wherein the request to access data represents an access to at least one of an application, a service, a feature, or a data item.

10. The system of claim 8, wherein the determining further comprises:
determining the owner of the data.

11. The system of claim 10 further comprising:
forming the query to include the attributes, the one or more attributes including the identity of the entity making the request, the type of the data, and the owner of the data.

12. The system of claim 11 further comprising:
receiving, from the use case database, the response to the query.

13. The system of claim 8 further comprising:
receiving, from the arbitrator, an indication of whether the conflict request resulted in an approval to access the data.

14. A method comprising:
at least one processor that causes operations comprising:
receiving a request to access data;
determining, from the request, one or more attributes representative of an identity of an entity making the request and a type of the data;
sending, by a permission controller, a query to a use case database, the query including the determined attributes to enable an identification by the use case database of a matching use case stored in the use case database;
approving, by the permission controller, the requested access to the data, when a response to the query indicates the matching use case was found in the use case database;
rejecting, by the permission controller, the requested access to the data, when the response to the query indicates the matching use case was not found in the use case database;
sending, by the permission controller, a conflict request to an arbitrator, the conflict request representing a request to add another use case to the use case database, the conflict request including the one or more attributes, the one or more attributes including the identity of the entity making the request, the type of the data, and an owner of the data, when the response to the query indicates the matching use case was not found in the use case database;

receiving, from the arbitrator, an indication of whether the conflict request resulted in an approval to access the data; and sending, by the permission controller when the indication represents the approval, another query to the use case database, the other query including the identity of the entity making the request, the type of the data, and the owner of the data, wherein the use case database includes, as a result of an update provided by the arbitrator, a corresponding matching use case for the other query.

15. The method of claim 14, wherein the request to access data represents an access to at least one of an application, a service, a feature, or a data item.

16. The method of claim 14, wherein the determining further comprises:

determining an owner of the data.

17. The method of claim 16 further comprising:

forming the query to include the one or more attributes, the attributes including the identity of the entity making the request, the type of the data, and the owner of the data.

18. The method of claim 14 further comprising:

receiving, from the use case database, the response to the query.

19. The method of claim 14 further comprising:

receiving, by the permission controller, an access denied message, when the indication does not represent the approval.

20. The method of claim 14, wherein the matching use case matches the one or more attributes.

* * * * *